United States Patent [19]

Sarai et al.

[11] 4,387,853
[45] Jun. 14, 1983

[54] WASHING LIQUID INJECTION DEVICE FOR THE REAR WINDOW GLASS OF A VEHICLE

[75] Inventors: Hiroshi Sarai, Toyota; Gosaku Terabayashi, Okazaki, both of Japan

[73] Assignee: Toyota Jidosha Kogyo Kabushiki Kaisha, Toyota, Japan

[21] Appl. No.: 281,375

[22] Filed: Jul. 8, 1981

[30] Foreign Application Priority Data

Jul. 25, 1980 [JP] Japan ............................ 55-104437[U]

[51] Int. Cl.³ ............................................... B05B 1/10
[52] U.S. Cl. .............................. 239/284 R; 15/250.01; 296/84 A
[58] Field of Search ................... 239/284 R, 284 A; 15/250.01, 250.02; 296/84 A

[56] References Cited

U.S. PATENT DOCUMENTS

| 2,306,778 | 12/1942 | Carney | 15/250.01 |
| 2,312,187 | 2/1943 | Patterson | 239/284 R |
| 2,701,897 | 2/1955 | Leming | 239/284 R |
| 2,968,071 | 1/1961 | Di Perna | 239/284 R |
| 3,414,317 | 12/1968 | Mortimer | 239/284 R |
| 4,212,425 | 7/1980 | Schlick | 239/284 R |

FOREIGN PATENT DOCUMENTS

| 1913416 | 11/1969 | Fed. Rep. of Germany | 15/250.01 |
| 1804576 | 12/1970 | Fed. Rep. of Germany | 239/284 R |
| 2210178 | 9/1973 | Fed. Rep. of Germany | 239/284 R |
| 2549373 | 5/1977 | Fed. Rep. of Germany | 239/284 R |
| 2756207 | 6/1979 | Fed. Rep. of Germany | 296/84 A |
| 1340692 | 12/1973 | United Kingdom | 239/284 R |

*Primary Examiner*—John J. Love
*Assistant Examiner*—Michael J. Forman
*Attorney, Agent, or Firm*—Parkhurst & Oliff

[57] ABSTRACT

A washing liquid injection device comprising a pair of washing liquid injection nozzles. Each of the washing liquid nozzles is arranged on a window molding which covers the lower periphery of the rear window glass. A washing liquid conduit is arranged under the window molding. A portion of a washing liquid feed passage is formed in a molding retainer which serves to fix the window molding onto the rear window glass.

7 Claims, 7 Drawing Figures

WASHING LIQUID INJECTION DEVICE FOR THE REAR WINDOW GLASS OF A VEHICLE

DESCRIPTION OF THE INVENTION

The present invention relates to a washing liquid injection device for the rear window glass of a vehicle.

A conventional washing liquid injection nozzle for the rear window glass of a vehicle is arranged on the roof panel at a position located above the upper edge of the rear window glass. However, in the case wherein the washing liquid injection nozzle is arranged on the rear window glass as mentioned above, since it is necessary to bore the roof panel, a problem occurs in that time and labor, which are necessary to produce a motor vehicle, is increased. In addition, since the piping route of the washing liquid conduit connected to the washing liquid injection nozzle becomes complicated, another problem occurs in that it takes a long time for piping the washing water conduit. Furthermore, in the case wherein the washing liquid injection nozzle is arranged on the roof panel as mentioned above, since a distance between the washing liquid injection nozzle and an optimum washing liquid injection area on the rear window glass becomes long, a further problem occurs in that it is impossible to always inject the washing liquid onto the above-mentioned optimum washing liquid injection area under the influence of air flow when the vehicle is driven. In addition, since the washing liquid injection nozzle projects upwardly from the roof panel, a still further problem occurs in that a good external appearance cannot be obtained.

An object of the present invention is to provide a washing liquid injection device for the rear window glass, which can be easily assembled onto the vehicle and is capable of ensuring an easy piping operation of the washing liquid conduit and assuredly injecting the washing liquid onto the above-mentioned optimum washing liquid injection area on the rear window glass.

According to the present invention, there is provided a device for injecting a washing liquid onto a rear window glass which is fixed onto a vehicle body and has a lower peripheral edge covered by a window molding, said device comprising: a nozzle apparatus fixed onto said window molding which covers the lower peripheral edge of the rear window glass and having a washing liquid inlet and a washing liquid outlet which is directed to a predetermined area on the rear window glass, and; a washing liquid conduit apparatus arranged under the window molding and having a washing liquid inlet and a washing liquid outlet which is connected to the washing liquid inlet of said nozzle apparatus.

The present invention may be more fully understood from the description of a preferred embodiment of the invention set forth below, together with the accompanying drawings.

DESCRIPTION OF A PREFERRED EMBODIMENT

Figure 1:
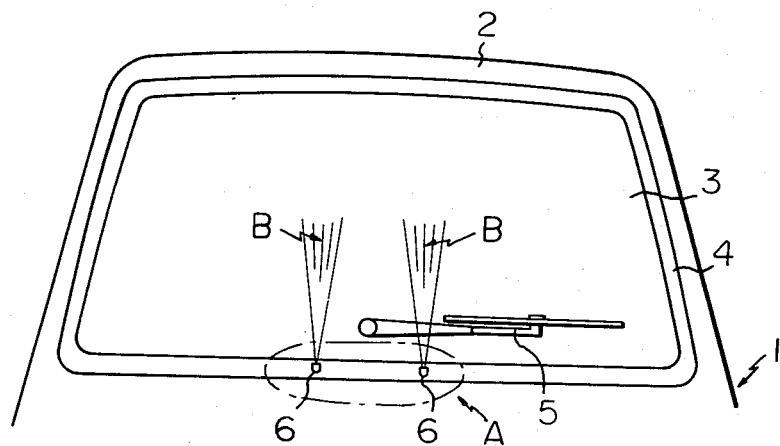
FIG. 1 is a front view of the rear window glass of a vehicle.
Figure 2:
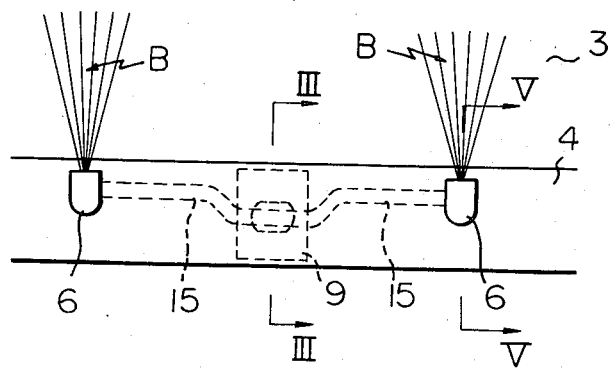
FIG. 2 is an enlarged view of a portion enclosed by the circle A in FIG. 1.
Figure 3:
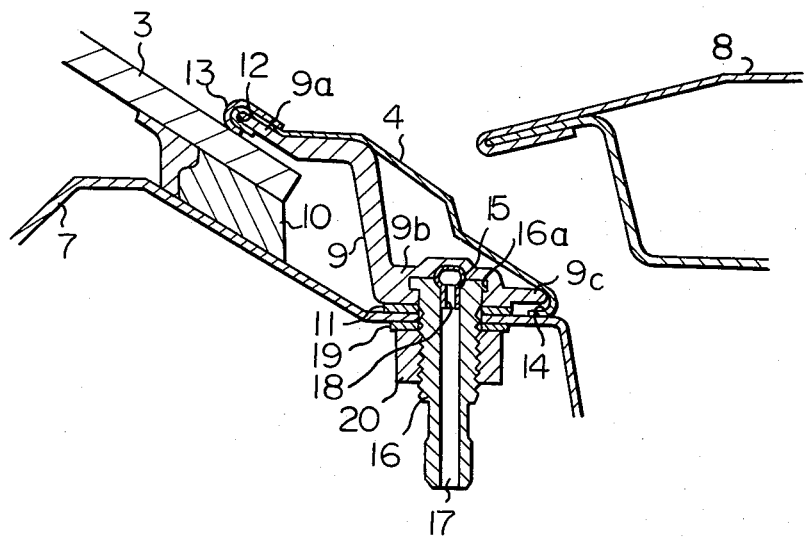
FIG. 3 is an enlarged cross-sectional side view taken along the line III—III in FIG. 2.
Figure 4:
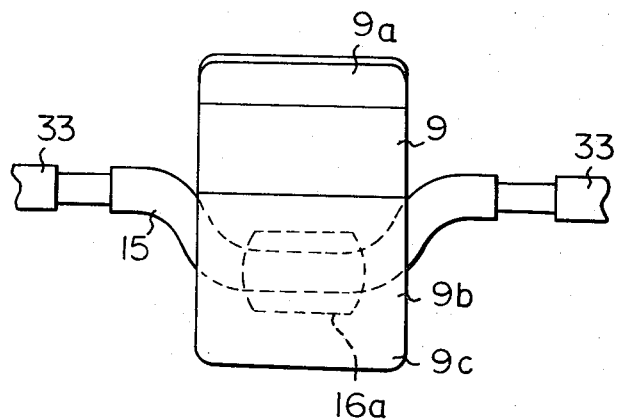
FIG. 4 is a plan view of the molding retainer and the washing liquid conduit illustrated in FIG. 3.

Referring to FIGS. 1 and 2, 1 designates a vehicle body, 2 a roof panel, 3 a rear window glass, and 4 a decorative window molding covering the outer periphery of the rear window glass; 5 designates a wiper, and 6 a pair of washing liquid injection nozzles arranged on the window molding 4 covering the underside periphery of the rear window glass 3. Washing liquid, injected from the washing liquid injection nozzles 6, is illustrated by B in FIGS. 1 and 2. Referring to FIGS. 3 and 4, reference numeral 7 designates an upper back panel constructing a portion of the vehicle body 1, 8 a luggage panel covering the trunk room of the vehicle, and 9 a molding retainer made of a synthetic resin. The rear window glass 3 is fixed onto the upper back panel 7 by an adhesive 10. The molding retainer 9 comprises a tongue shaped front end portion 9a slightly spaced from the surface of the rear window glass 3 and extending forward and upward along the surface of the rear window glass 3, a base portion 9b fixed onto the upper back panel 7 via a seal member 11, and a tongue shaped rear end portion 9c extending rearward from the base portion 9b. The front end of the window molding 4 is inwardly bent, and the tongue shaped front end portion 9a of the molding retainer 9 is fitted into a recess 12 thus formed. As illustrated in FIG. 3, the outer surface of the bending portion of the front end of the window molding 4 is covered by a seal member 13 made of a synthetic resin. The rear end of the window molding 4 is also inwardly bent, and the tongue shaped rear end portion 9c of the window molding 9 is fitted into a recess 14 thus formed. A washing liquid conduit 15 and an enlarged head portion 16a of a bolt 16 are embedded in the base portion 9b of the window molding 9, and a washing liquid feed bore 17 is formed in the bolt 16. The washing liquid conduit 15 extends in the longitudinal direction of the window molding 4 across the molding retainer 9 and has a pseudoellipse cross-section. In addition, the washing liquid conduit 15 has on its central portion a tubular projecting portion 18 which is fitted into the washing liquid feed bore 17 of the bolt 16. The washing liquid conduit 15 and the enlarged head portion 16a of the bolt 16 are embedded in the molding retainer 9 when the molding retainer 9 is formed by the casting operation. The bolt 16 is fixed onto the upper back panel 7 via a washer 19 by means of a nut 20 and, thereby, the window molding 4 is firmly fixed onto the rear window glass 3 and the upper back panel 7 by means of the molding retainer 9. As illustrated in FIG. 2, the washing liquid conduit 15 extends in opposite directions from the molding retainer 9, and the opposite ends of the washing liquid conduit 15 are connected to the corresponding washing liquid injection nozzles 6.

Figure 5:
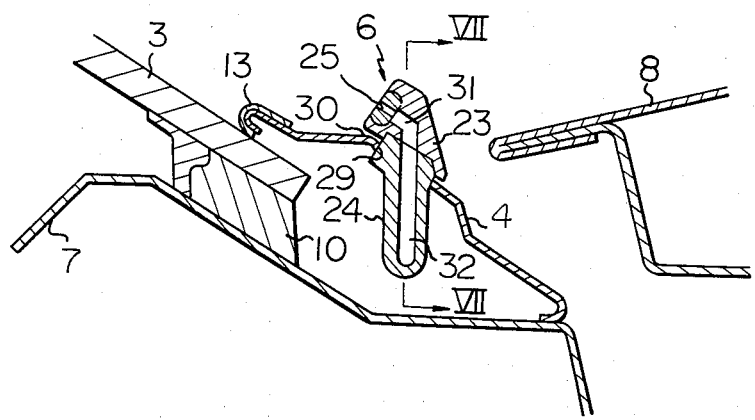
FIG. 5 is an enlarged cross-sectional side view taken along the line V—V in FIG. 2.
Figure 6:
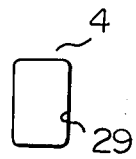
FIG. 6 is a view illustrating the contour shape of the opening formed on a window molding.
Figure 7:
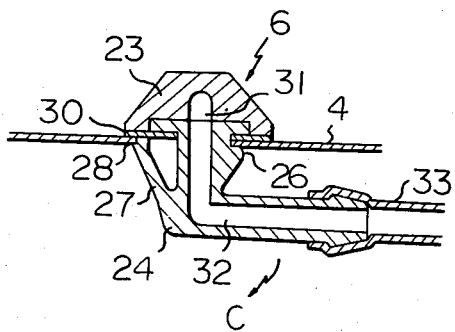
FIG. 7 is a cross-sectional side view taken along the line VII—VII in FIG. 5.

As illustrated in FIGS. 5 and 7, the washing liquid injection nozzle 6 comprises a base portion 23 and a nozzle supporting portion 24 welded to the base portion 23, and a nozzle 25 is formed in the base portion 23. In addition, as illustrated in FIG. 7, the nozzle supporting portion 24 has on its right side wall a claw 28 which is engageable with the underside wall of the window molding 4, and an obliquely and upwardly extending arm 27 is formed in one piece on the left side wall of the nozzle supporting portion 24, which is located opposite to the claw 28 with respect to the nozzle supporting portion 24. This arm 27 has on its upper portion a claw 28 which is engageable with the underside wall of the window molding 4. As will be understood from FIG. 7, the claw 28, formed on the arm 27, has a width which is smaller than that of the claw 26 formed on the right side wall of the nozzle supporting portion 24. On the other hand, as illustrated in FIGS. 5 and 6, a longitudinally extending rectangular opening 29 is formed on the window molding 4, and the nozzle supporting portion 24 of the nozzle 6 is fitted into the opening 29. At this time, firstly, the arm 27 is temporarily bent towards the claw 26 and, then, the arm 27 is returned to the original position as illustrated in FIG. 7. As a result of this, both the claws 26 and 28 come into engagement with the underside wall of the window molding 4 and, thereby, the nozzle 6 is fixed onto the window molding 4 via a seal member 30. When, for example, it is necessary to exchange the nozzle 6 for a new one, the nozzle 6 is rotated in the direction illustrated by the arrow C in FIG. 7. At this time, since the width of the claw 28 is smaller than that of the claw 26, the claw 28 is easily disengaged from the underside wall of the window molding 4 and, thus, the nozzle 6 can be easily removed from the opening 29.

As illustrated in FIGS. 5 and 7, washing liquid feed bores 31 and 32, which are in communication with the nozzle 25, are formed in the base portion 23 and the nozzle supporting portion 24, respectively, and the washing liquid feed bore 32 is connected to the washing liquid feed conduit 15 via a washing liquid feed conduit 33 arranged under the window molding 4. In FIG. 3, the washing liquid feed bore 17, formed in the bolt 16, is connected to the washing liquid tank (not shown) arranged in the trunk room via the washing liquid feed pump (not shown). Consequently, when the washing liquid feed pump is operated, the washing liquid in the washing liquid tank is divided into two liquid streams in the washing liquid feed conduit 15 and injected from the nozzles 25 onto the rear window glass 3.

According to the present invention, by arranging the washing liquid injection nozzles on the window molding, it is possible to shorten the distance between the optimum washing liquid injection area on the rear window glass and the washing liquid injection nozzles. As a result of this, since an air flow, caused when the vehicle is driven, has less influence on the flow of the washing liquid injected from the washing liquid injection nozzles, it is possible to always inject the washing liquid onto the above-mentioned optimum washing liquid injection area on the rear window glass. In addition, since it is possible to shorten the distance between the washing liquid tank and the washing liquid injection nozzles by arranging the washing liquid injection nozzles on the window molding, and since the washing liquid conduit is assembled onto the vehicle body at the same time as the window molding, time and labor, which are necessary for piping the washing liquid conduit, are considerably reduced. Furthermore, since the molding retainer, which is necessary to fix the window molding onto the rear window glass, can be utilized as a portion of the washing liquid conduit, there is the added advantage that the number of parts can be reduced.

While the invention has been described by reference to a specific embodiment chosen for purposes of illustration, it should be apparent that numerous modifications could be made thereto by those skilled in the art without departing from the basic concept and scope of the invention.

We claim:

1. A device for injecting a washing liquid onto a rear window glass which is fixed onto a vehicle body and has a lower peripheral edge covered by a window molding, said device comprising:

a nozzle apparatus fixed onto said window molding which covers the lower peripheral edge of the rear window glass and having a washing liquid inlet and a washing liquid outlet which is directed to a predetermined area on the rear window glass; and a washing liquid conduit apparatus arranged under the window molding and having a washing liquid inlet and a washing liquid outlet which is fluidly connected to the washing liquid inlet of said nozzle apparatus, said washing liquid conduit apparatus comprises a molding retainer having a washing liquid feed bore therein, and a washing liquid conduit supported by said molding retainer and connected to said washing liquid feed bore, said molding retainer comprises a bolt integrally formed thereon and passing through an opening formed on the vehicle body and is fixed onto the vehicle body by means of a nut screwed onto said bolt, said washing liquid feed bore being formed in said bolt.

2. A device according to claim 1, wherein the window molding has an opening formed thereon, and said nozzle apparatus is removably fitted into said opening.

3. A device according to claim 2, wherein said nozzle apparatus comprises a first claw which is engageable with an underside wall of the window molding, and a movable arm located at a position opposite to said first claw and having a second claw which is engageable with the underside wall of the window molding.

4. A device according to claim 3, wherein said first claw has a width which is wider than that of said second claw.

5. A device according to claim 1, wherein said nozzle apparatus comprises a pair of spaced nozzles arranged on each side of said washing liquid conduit apparatus.

6. A device according to claim 1, wherein said molding retainer is fixed onto the vehicle body and comprises a front end portion engaging with an inner peripheral end of the window molding for fixing said inner peripheral end onto the rear window glass, and a rear end portion engaging with an outer peripheral end of the window molding for fixing said outer peripheral end onto the vehicle body.

7. A device according to claim 1, wherein said washing liquid feed bore extends perpendicular to said washing liquid conduit passing through said molding retainer, said washing liquid conduit having a tubular projecting portion which is inserted into said washing liquid feed bore.

* * * * *